(12) United States Patent
Lin et al.

(10) Patent No.: US 11,654,638 B2
(45) Date of Patent: May 23, 2023

(54) WELDING PROCESS AND PRODUCT FOR INFLATABLE PRODUCT

(71) Applicant: Intex Marketing Ltd., Tortola (VG)

(72) Inventors: Hua Hsiang Lin, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 17/365,621

(22) Filed: Jul. 1, 2021

(65) Prior Publication Data

US 2021/0331425 A1    Oct. 28, 2021

Related U.S. Application Data

(60) Continuation of application No. 16/103,049, filed on Aug. 14, 2018, now Pat. No. 11,065,823, which is a
(Continued)

(30) Foreign Application Priority Data

Nov. 25, 2013   (CN) .......................... 201310598878.5

(51) Int. Cl.
   *B29C 65/00*   (2006.01)
   *B32B 3/08*    (2006.01)
   (Continued)

(52) U.S. Cl.
   CPC .......... *B29C 66/004* (2013.01); *A47C 27/081* (2013.01); *A47C 27/087* (2013.01);
   (Continued)

(58) Field of Classification Search
   CPC ..... A47C 27/081; A47C 27/087; B29C 65/04; B29C 65/242; B29C 66/004;
   (Continued)

(56) References Cited

U.S. PATENT DOCUMENTS

| 573,122 A | 12/1896 | Young |
| 818,321 A | 4/1906 | Whall |

(Continued)

FOREIGN PATENT DOCUMENTS

| CH | 197243 A | 4/1938 |
| CH | 438622 A | 6/1967 |

(Continued)

OTHER PUBLICATIONS

New Zealand Intellectual Property Office, Patent Examination Report 2, Application No. 720589, Welding Process and Product for Inflatable Product, dated Feb. 11, 2021, 3 pages.

(Continued)

*Primary Examiner* — David R Hare
*Assistant Examiner* — Alexis Felix Lopez
(74) *Attorney, Agent, or Firm* — Faegre Drinker Biddle & Reath LLP (57) ABSTRACT

A welding process of an inflatable product is provided that includes using isolating members between first and second portions of weldable tensioning members to resist the first and second portions of the weldable tensioning structures being welded together during welding of the first portions to a first sheet of weldable material and welding of the second portions to a second sheet of weldable material.

9 Claims, 4 Drawing Sheets

Related U.S. Application Data continuation of application No. 15/416,601, filed on Jan. 26, 2017, now Pat. No. 10,076,874, which is a division of application No. 14/553,705, filed on Nov. 25, 2014, now abandoned.

(51) Int. Cl.

| | | |
|---|---|---|
| *B32B 5/02* | (2006.01) | |
| *B32B 5/24* | (2006.01) | |
| *B32B 7/12* | (2006.01) | |
| *B32B 27/06* | (2006.01) | |
| *B32B 29/00* | (2006.01) | |
| *B32B 3/26* | (2006.01) | |
| *B29C 65/04* | (2006.01) | |
| *A47C 27/08* | (2006.01) | |
| *B29C 65/24* | (2006.01) | |
| *B32B 27/30* | (2006.01) | |
| *B32B 37/06* | (2006.01) | |
| *B32B 37/26* | (2006.01) | |
| *B29L 22/02* | (2006.01) | |
| *B29L 31/00* | (2006.01) | |
| *B32B 7/14* | (2006.01) | |
| *B29K 27/06* | (2006.01) | |
| *B29K 105/00* | (2006.01) | |

(52) U.S. Cl.
CPC ............ *B29C 65/04* (2013.01); *B29C 65/242* (2013.01); *B29C 66/0044* (2013.01); *B29C 66/1122* (2013.01); *B29C 66/438* (2013.01); *B29C 66/474* (2013.01); *B29C 66/7315* (2013.01); *B29C 66/73921* (2013.01); *B29C 66/81427* (2013.01); *B29C 66/8322* (2013.01); *B29C 66/8432* (2013.01); *B32B 3/085* (2013.01); *B32B 3/266* (2013.01); *B32B 5/022* (2013.01); *B32B 5/24* (2013.01); *B32B 7/12* (2013.01); *B32B 27/06* (2013.01); *B32B 27/304* (2013.01); *B32B 29/002* (2013.01); *B32B 37/06* (2013.01); *B32B 37/26* (2013.01); *B29C 66/4722* (2013.01); *B29C 66/71* (2013.01); *B29C 66/723* (2013.01); *B29K 2027/06* (2013.01); *B29K 2105/256* (2013.01); *B29L 2022/02* (2013.01); *B29L 2031/751* (2013.01); *B32B 7/14* (2013.01); *B32B 2327/06* (2013.01); *Y10T 428/1352* (2015.01)

(58) Field of Classification Search
CPC ............ B29C 66/0044; B29C 66/1122; B29C 66/438; B29C 66/4722; B29C 66/474; B29C 66/71; B29C 66/723; B29C 66/7315; B29C 66/73921; B29C 66/81427; B29C 66/8322; B29C 66/8432; B29K 2027/06; B29L 2022/02; B29L 2031/751; B32B 3/085; B32B 5/022; B32B 5/24; B32B 7/12; B32B 7/14; B32B 27/06; B32B 27/304; B32B 29/002; B32B 37/06; B32B 37/26; B32B 2327/06; Y10T 428/1352; B63B 7/08; B63B 32/51; B63B 34/22; B63C 2009/042; A61H 37/005; E04H 4/0025

See application file for complete search history.

(56) References Cited

U.S. PATENT DOCUMENTS

| | | | |
|---|---|---|---|
| 1,331,018 A | 2/1920 | Luthy | |
| 1,625,810 A | 4/1927 | Krichbaum | |
| 1,775,942 A | 9/1930 | Millmather | |
| 1,916,483 A * | 7/1933 | Krichbaum | A47C 27/087 2/88 |
| 2,318,492 A | 5/1943 | Johnson | |
| 2,549,597 A | 4/1951 | Harris et al. | |
| 2,674,297 A | 4/1954 | Greenwald | |
| 2,724,129 A | 11/1955 | Pugh | |
| 2,743,510 A | 5/1956 | Paul et al. | |
| 2,753,573 A | 7/1956 | Barker | |
| 3,008,213 A | 11/1961 | Foster et al. | |
| 3,092,101 A | 6/1963 | Kinney | |
| 3,196,531 A | 7/1965 | Ripling | |
| 3,336,921 A | 8/1967 | Lloyd | |
| 3,522,123 A | 7/1970 | Marchant | |
| 3,573,151 A | 3/1971 | Dawbarn | |
| 3,583,431 A | 6/1971 | Diel | |
| 3,899,622 A | 8/1975 | Geiger | |
| 4,158,584 A * | 6/1979 | Clarke | B29C 66/8322 156/580.2 |
| 4,190,917 A * | 3/1980 | Calleance | A47C 27/087 5/932 |
| 4,295,918 A | 10/1981 | Benson et al. | |
| 4,360,396 A | 11/1982 | Marbach | |
| 4,535,490 A | 8/1985 | Wright | |
| 4,545,519 A | 10/1985 | Renshaw et al. | |
| 4,566,443 A | 1/1986 | Bucher | |
| 4,754,502 A | 7/1988 | Bowen | |
| 4,773,104 A | 9/1988 | Wang | |
| 4,843,659 A | 7/1989 | Popovich et al. | |
| 4,899,401 A | 2/1990 | Savarese | |
| 4,920,588 A | 5/1990 | Watkins | |
| 4,981,543 A | 1/1991 | Popovich et al. | |
| 5,022,109 A * | 6/1991 | Pekar | B29C 65/04 5/932 |
| 5,083,361 A | 1/1992 | Rudy | |
| 5,095,559 A | 3/1992 | Liljegren et al. | |
| 5,101,823 A | 4/1992 | Smith | |
| 5,135,440 A | 8/1992 | Smollar et al. | |
| 5,137,592 A * | 8/1992 | LaBianco | B29C 66/05 156/290 |
| 5,249,323 A | 10/1993 | Kikuchi et al. | |
| 5,283,915 A | 2/1994 | Idland et al. | |
| 5,337,754 A | 8/1994 | Heaven et al. | |
| 5,345,622 A | 9/1994 | Plone | |
| 5,345,996 A | 9/1994 | Druien | |
| 5,490,295 A | 2/1996 | Boyd | |
| 5,543,194 A | 8/1996 | Rudy | |
| 5,567,127 A | 10/1996 | Wentz | |
| 5,585,025 A | 12/1996 | Idland | |
| 5,608,931 A | 3/1997 | Gancy | |
| D386,238 S | 11/1997 | Peterson | |
| 5,718,007 A | 2/1998 | Loyd | |
| 5,735,000 A | 4/1998 | Pfaeffle | |
| 5,809,942 A | 9/1998 | Kralovec et al. | |
| 5,865,564 A | 2/1999 | Miller et al. | |
| 5,924,144 A | 7/1999 | Peterson | |
| 5,985,071 A | 11/1999 | Wynne et al. | |
| 6,003,166 A | 12/1999 | Hald et al. | |
| 6,108,829 A | 8/2000 | Wadsworth | |
| 6,209,150 B1 | 4/2001 | Hsu et al. | |
| 6,322,870 B1 | 11/2001 | Tsai | |
| 6,357,059 B1 | 3/2002 | Lau | |
| 6,384,864 B1 | 5/2002 | Kim | |
| 6,405,386 B1 | 6/2002 | Chang | |
| 6,412,123 B1 | 7/2002 | Lau | |
| 6,450,393 B1 | 9/2002 | Doumanidis et al. | |
| 6,474,373 B1 | 11/2002 | Sejnowski | |
| 6,543,962 B2 | 4/2003 | Wells | |
| 6,571,405 B1 | 6/2003 | Saputo et al. | |
| 6,859,953 B1 | 3/2005 | Christensen | |
| 7,032,258 B2 | 4/2006 | O'Hanlon | |
| 7,070,845 B2 | 7/2006 | Thomas et al. | |
| 7,254,853 B1 | 8/2007 | Kim | |
| 7,334,274 B2 | 2/2008 | Wang | |
| 7,370,375 B2 | 5/2008 | Phillips | |
| 7,409,779 B2 | 8/2008 | Dojan et al. | |
| 7,461,416 B2 | 12/2008 | Stover | |
| 7,467,496 B1 | 12/2008 | Cuisset et al. | |
| 7,591,036 B2 | 9/2009 | Lin et al. | |
| 7,694,372 B1 | 4/2010 | Boyd | |

(56) References Cited

U.S. PATENT DOCUMENTS

| | | |
|---|---|---|
| 7,797,770 B2 | 9/2010 | Lau |
| 7,818,825 B2 | 10/2010 | Lau |
| 7,987,531 B2 | 8/2011 | West |
| 8,012,201 B2 | 9/2011 | Lashinski et al. |
| 8,095,998 B2 | 1/2012 | Lau |
| 8,108,954 B2 | 2/2012 | Lau |
| 8,151,486 B2 | 4/2012 | Dua |
| 8,166,589 B2 | 5/2012 | Hijlkema |
| 8,241,451 B2 | 8/2012 | Rapaport et al. |
| 8,479,412 B2 | 7/2013 | Peyton et al. |
| 8,562,773 B2 | 10/2013 | Lin et al. |
| 8,789,294 B2 | 7/2014 | Dojan et al. |
| 8,813,389 B2 | 8/2014 | Gishifu et al. |
| 9,254,240 B2 | 2/2016 | Lin et al. |
| 10,076,874 B2 | 9/2018 | Lin et al. |
| 11,065,823 B2 | 7/2021 | Lin et al. |
| 2002/0020014 A1 | 2/2002 | Authier et al. |
| 2002/0029414 A1 | 3/2002 | Shun Lau |
| 2002/0053106 A1 | 5/2002 | Turner |
| 2004/0040083 A1 | 3/2004 | Bentley |
| 2005/0066433 A1 | 3/2005 | Phillips |
| 2005/0097777 A1 | 5/2005 | Goodwin |
| 2005/0235406 A1 | 10/2005 | August |
| 2006/0020332 A1 | 1/2006 | Lashinski et al. |
| 2006/0025854 A1 | 2/2006 | Lashinski et al. |
| 2006/0025855 A1 | 2/2006 | Lashinski et al. |
| 2006/0137087 A1 | 6/2006 | Carreau et al. |
| 2006/0260038 A1 | 11/2006 | Lau |
| 2007/0040368 A1 | 2/2007 | Manley |
| 2008/0105366 A1 | 5/2008 | Wang |
| 2008/0141449 A1 | 6/2008 | Ren |
| 2008/0172783 A1 | 7/2008 | Smith et al. |
| 2009/0089924 A1 | 4/2009 | Jan |
| 2009/0133828 A1 | 5/2009 | Wu |
| 2009/0241252 A1 | 10/2009 | Li |
| 2010/0107333 A1 | 5/2010 | Ortlieb |
| 2010/0325807 A1 | 12/2010 | Wu |
| 2011/0047691 A1 | 3/2011 | Huang et al. |
| 2011/0094025 A1 | 4/2011 | West |
| 2011/0219530 A1 | 9/2011 | Hollaway |
| 2012/0000017 A1 | 1/2012 | Xia et al. |
| 2012/0031265 A1 | 2/2012 | Song et al. |
| 2012/0124732 A1 | 5/2012 | Lau |
| 2012/0124734 A1 | 5/2012 | Lau |
| 2012/0297530 A1 | 11/2012 | Huang |
| 2013/0230671 A1* | 9/2013 | Lin ............... A47C 27/081 428/12 |
| 2014/0339224 A1 | 11/2014 | Wiater |
| 2015/0020306 A1 | 1/2015 | Lin et al. |
| 2015/0147503 A1 | 5/2015 | Lin et al. |

FOREIGN PATENT DOCUMENTS

| | | | |
|---|---|---|---|
| CN | 2064797 U | | 10/1990 |
| CN | 2074591 U | | 4/1991 |
| CN | 2287948 Y | | 8/1998 |
| CN | 2361179 Y | | 2/2000 |
| CN | 1280467 A | | 1/2001 |
| CN | 1124804 C | | 10/2003 |
| CN | 1506140 A | | 6/2004 |
| CN | 2659261 Y | * | 12/2004 |
| CN | 2659261 Y | | 12/2004 |
| CN | 2676755 Y | | 2/2005 |
| CN | 2706070 Y | | 6/2005 |
| CN | 2776171 Y | | 5/2006 |
| CN | 1867280 A | | 11/2006 |
| CN | 2908147 Y | | 6/2007 |
| CN | 2930467 Y | | 8/2007 |
| CN | 201032956 Y | | 3/2008 |
| CN | 201169931 Y | | 12/2008 |
| CN | 101628698 A | | 1/2010 |
| CN | 101817233 A | | 9/2010 |
| CN | 201790383 U | | 4/2011 |
| CN | 202151339 U | | 2/2012 |
| CN | 202267222 U | | 6/2012 |
| CN | 203619151 U | | 6/2014 |
| DE | 1479712 A1 | | 7/1969 |
| DE | 20317936 U1 | | 2/2004 |
| DE | 202004000700 U1 | | 6/2004 |
| DE | 202004002168 U1 | | 3/2005 |
| DE | 102006053666 A1 | | 5/2008 |
| DE | 102012003969 A1 | | 8/2013 |
| DE | 102012003969 A1 | * | 8/2013 ........... A47C 27/081 |
| EA | 200802274 A1 | | 4/2009 |
| EP | 0152536 A2 | | 8/1985 |
| EP | 0678263 A1 | | 10/1995 |
| EP | 1138307 A2 | | 10/2001 |
| FR | 2456608 A1 | | 12/1980 |
| FR | 2856008 A1 | | 12/2004 |
| FR | 2979809 A1 | | 3/2013 |
| GB | 0313023 A | | 6/1929 |
| GB | 0410502 A | | 5/1934 |
| GB | 1380153 A | | 1/1975 |
| JP | 60-055904 A | | 4/1985 |
| JP | 07-327782 A | | 12/1995 |
| JP | 08-103957 A | | 4/1996 |
| JP | H08103957 A | * | 4/1996 |
| JP | 2006-527017 A | | 11/2006 |
| JP | 2007-506529 A | | 3/2007 |
| JP | 2012-005620 A | | 1/2012 |
| KR | 20150024609 A | * | 3/2015 |
| SU | 410502 A1 | | 1/1974 |
| WO | 2004/108047 A1 | | 12/2004 |
| WO | 2005/030005 A2 | | 4/2005 |
| WO | 2009/050824 A1 | | 4/2009 |
| WO | 2013/020464 A1 | | 2/2013 |
| WO | 2013/034864 A1 | | 3/2013 |

OTHER PUBLICATIONS

Canadian Search Report dated Jun. 19, 2017 in corresponding Canadian Application No. 2,931,453.
Definition of "wrap" from freedictionary.com on Feb. 14, 2017.
European Search Report dated Dec. 20, 2017 in corresponding European Application No. 17185649.5, 9 pages.
European Search Report dated Oct. 11, 2017 in corresponding European Application No. 14864535.1, 9 pages.
Examination Report dated Aug. 19, 2016 in corresponding Australian Application No. AU2014352637.
Examination Report for CN 201310598878.5 (Translation), Mar. 4, 2016, 10 pages.
International Preliminary Report on Palenlability dated Dec. 11, 2015 in PCT/US14/067457.
International Search Report and Written Opinion dated Mar. 4, 2015 in International Application No. PCT/US2014/067457.
Preliminary Examination Report dated Feb. 2, 2017 in corresponding Colombia Application No. 16165944.
Search Report dated Mar. 8, 2017 in corresponding Panama Application No. 91157-01.

* cited by examiner

WELDING PROCESS AND PRODUCT FOR INFLATABLE PRODUCT

CROSS REFERENCE TO RELATED APPLICATIONS

This application is a continuation of U.S. patent application Ser. No. 16/103,049, filed Aug. 14, 2018, which is a continuation of U.S. patent application Ser. No. 15/416,601, filed Jan. 26, 2017, now U.S. Pat. No. 10,076,874, which is a divisional of U.S. patent application Ser. No. 14/553,705, filed Nov. 25, 2014, which claims priority under 35 U.S.C. § 119 to Chinese Patent Application No. 201310598878.5, filed Nov. 25, 2013 and entitled "WELDING PROCESS AND PRODUCT FOR INFLATABLE PRODUCT", the entire disclosures of which are hereby incorporated by reference herein.

BACKGROUND

Technical Field

The present disclosure relates to an inflatable product and, in particular, to a method for attaching tensioning structures to walls of the inflatable product.

SUMMARY

According to the present disclosure, an inflatable product is provided that includes a first sheet made of weldable plastic and a second sheet made of weldable plastic. The first and second sheets cooperates to define an inflatable chamber. The inflatable product further includes a plurality of tensioning structures. Each tensioning structure includes a weldable plastic. A first portion of the tensioning structures is welded to the first sheet and a second portion of the tensioning structures is welded to the second sheet. The inflatable product further includes a plurality of isolating members positioned in the inflatable chamber. The isolating members are positionable to isolate the first portions of the tensioning structures from the second portions of the tensioning structures to block weldable contact between the first and second portions.

According to another aspect of the present disclosure, an inflatable product is provided that includes a first sheet made of weldable plastic and a second sheet made of weldable plastic. The first and second sheets cooperate to define an inflatable chamber. The inflatable product further includes a plurality of tensioning structures. Each tensioning structure includes a weldable plastic. A first portion of the tensioning structures are welded to the first sheet and a second portion of the tensioning structures are welded to the second sheet. The inflatable product further includes a portion of a non-metallic isolating member positioned in the inflatable chamber and coupled to at least one of the first and second portions of a tensioning structure of the plurality of tensioning structures.

According to another aspect of the present disclosure, an inflatable product is provided that includes a first sheet made of weldable plastic and a second sheet made of weldable plastic. The first and second sheets cooperate to define an inflatable chamber. The inflatable product further includes a plurality of tensioning structures. Each tensioning structure includes a weldable plastic. A first portion of the tensioning structures is welded to the first sheet and a second portion of the tensioning structures is welded to the second sheet. The first portions have structures and the second portions have contours matching at least a portion of the structures of the first portions.

According to another aspect of the present disclosure, an inflatable product is provided that includes a first sheet made of weldable plastic and a second sheet made of weldable plastic. The first and second sheets cooperate to define an inflatable chamber. The inflatable product further includes a plurality of tensioning structures. Each tensioning structure includes a weldable plastic. A first portion of the tensioning structures is welded to the first sheet and a second portion of the tensioning structures is welded to the second sheet. The first portions have a seam formed by a clamp. The second portions have a seam formed by the clamp. The perimeters of the seams of the second portions are substantially mirror images of perimeters of the seams of the first portions.

According to another aspect of the present disclosure, a method for producing an inflatable product is provided including the steps of providing a first sheet made of weldable plastic and providing a second sheet made of weldable plastic. The first and second sheets cooperate to define an inflatable chamber. The method further includes the step of providing a plurality of tensioning structures. Each tensioning structure includes a weldable plastic. The plurality of tensioning structures include a first portion and a second portion. The method further includes the step of simultaneously welding the first and second portions of the plurality of tensioning structures to the first and second sheets.

According to another aspect of the present disclosure, a method for producing an inflatable product is provided including the steps of providing a first sheet made of weldable plastic and providing a second sheet made of weldable plastic. The first and second sheets cooperate to define an inflatable chamber. The method further includes the step of providing a plurality of tensioning structures. Each tensioning structure includes a weldable plastic. The plurality of tensioning structures includes a first portion and a second portion. The method further includes the step of providing an isolating member on a roll. The isolating material is configured to isolate the first portions of the tensioning structures from the second portions of the tensioning structures. The method further includes the step of unwrapping the isolating member from the roll, positioning the isolating member between the first and second portions of the plurality of tensioning structures, welding the first portion of the plurality of tensioning structures to the first sheet while the isolating member is positioned between the first and second portions of the plurality of tensioning structures, and welding the second portion of the plurality of tensioning structures to the second sheet while the isolating member is positioned between the first and second portions of the plurality of tensioning structures.

According to another aspect of the present disclosure, a method for producing an inflatable product is provided including the steps of providing a first sheet made of weldable plastic and providing a second sheet made of weldable plastic. The first and second sheets cooperate to define an inflatable chamber. The method also includes the step of providing a plurality of tensioning structures, each tensioning structure including a weldable plastic. The plurality of tensioning structures includes a first portion and a second portion. The method further includes the step of folding the plurality of tensioning structures and welding the first portion of the plurality of tensioning structures to the first sheet and the second portion of the plurality of tensioning structures to the second sheet while the plurality of tensioning structures are folded.

According to another aspect of the present disclosure, a method for producing an inflatable product is provided that includes the steps of providing a first sheet made of weldable plastic and providing a second sheet made of weldable plastic. The first and second sheets cooperate to define an inflatable chamber. The method further includes the step of providing a plurality of tensioning structures. Each tensioning structure includes a weldable plastic. The plurality of tensioning structures includes a first portion and a second portion. The method further includes the step of clamping the first portions and second portions of the plurality of tensioning structures together, and welding the first portion of the plurality of tensioning structures to the first sheet and the second portion of the plurality of tensioning structures to the second sheet while the first and second portions of the plurality of tensioning structures are clamped together.

BRIEF DESCRIPTION OF THE DRAWINGS

The above-mentioned and other features of this disclosure, and the manner of attaining them, will become more apparent and the disclosure itself will be better understood by reference to the following description of an embodiment of the invention taken in conjunction with the accompanying drawings, wherein.

Corresponding reference characters indicate corresponding parts throughout the several views. The exemplification set out herein illustrates an exemplary embodiment of the present invention, and such exemplification is not to be construed as limiting the scope of the invention in any manner.

DETAILED DESCRIPTION

As shown in FIG. 1 to FIG. 6, a welding process for an inflatable product is provided. The welding process attaches tensioning structures 4 of an inflatable product 10 to inflatable sheets 5, 7 of inflatable product 10. A high-power, high-frequency welder 12 is used to attach tensioning structures 4 to inflatable sheets 5, 7.

Figure 1:
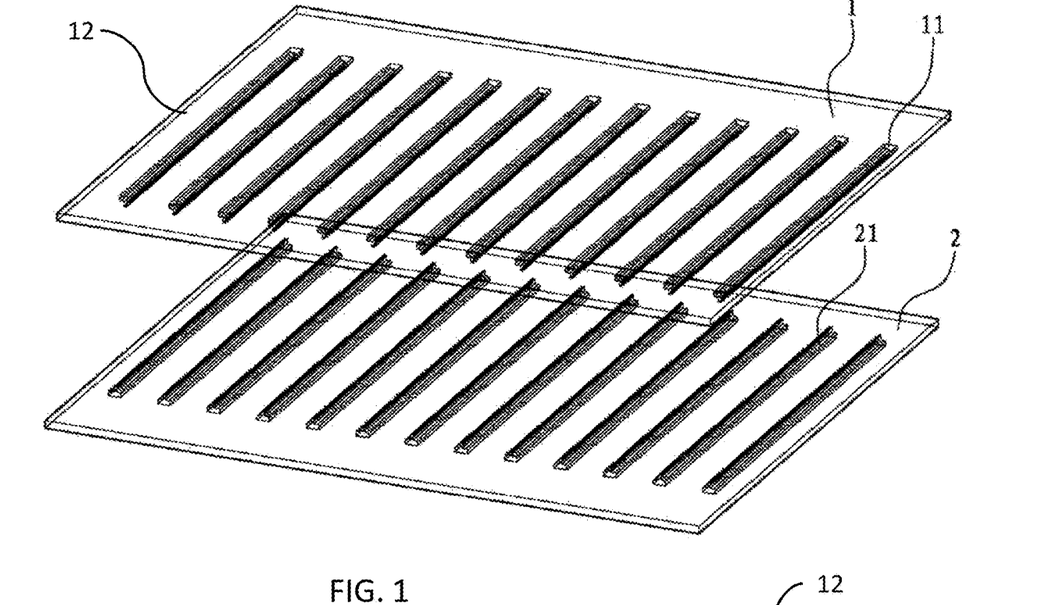
FIG. 1 is a schematic diagram showing a welder of the present disclosure including an upper die and a lower die.

Welder 12 includes an upper welding die 1, a lower welding die 2, upper bars 11, and lower bars 21 arranged opposite upper bars 11. According to the preferred embodiment of the present disclosure, upper and lower bars 11, 21 are high frequency electrodes that heat materials positioned adjacent thereto using high frequencies. According to alternative embodiments, other methods, such as heat, can be applied to melt the materials. Upper and lower bars 11, 21 are laterally spaced apart by the desired spacing of tensioning structures 4 in finished inflatable product 10. In the illustrated embodiment, bars 11, 21 are straight to match straight tensioning structures 4. According to alternative embodiments, bars 11, 21 may have other shapes, such as circles, to match tensioning structures 4 having other shapes, such as circular columns. The number of bars 11, 21 depends on the number of tensioning structures 4 in inflatable product 10.

According to one embodiment, a staging box 3 is provided that includes a plurality of slots 32 in bottom plate 31 that correspond to spacing of lower bars 21. As will be discussed in greater detail below, the components of inflatable product 10 are positioned in staging box 3 and then staging box 3 is positioned between upper and lower welding dies 1, 2 so that lower bars 21 align with slots 32 to facilitate welding of tensioning structures 4 to inflatable sheets 5, 7. Each bar 21 of lower die 2 penetrates through slots 32, thereby contacting tensioning structures 4 staging box 3. Upper and lower dies 1, 2 are drawn together so that lower bars 21 abut bars 11 of upper die 1 with the respective components of inflatable product 10 sandwiched therebetween. According to alternative embodiments, staging box 3 is not used to place the components in welder 12.

Figure 2:
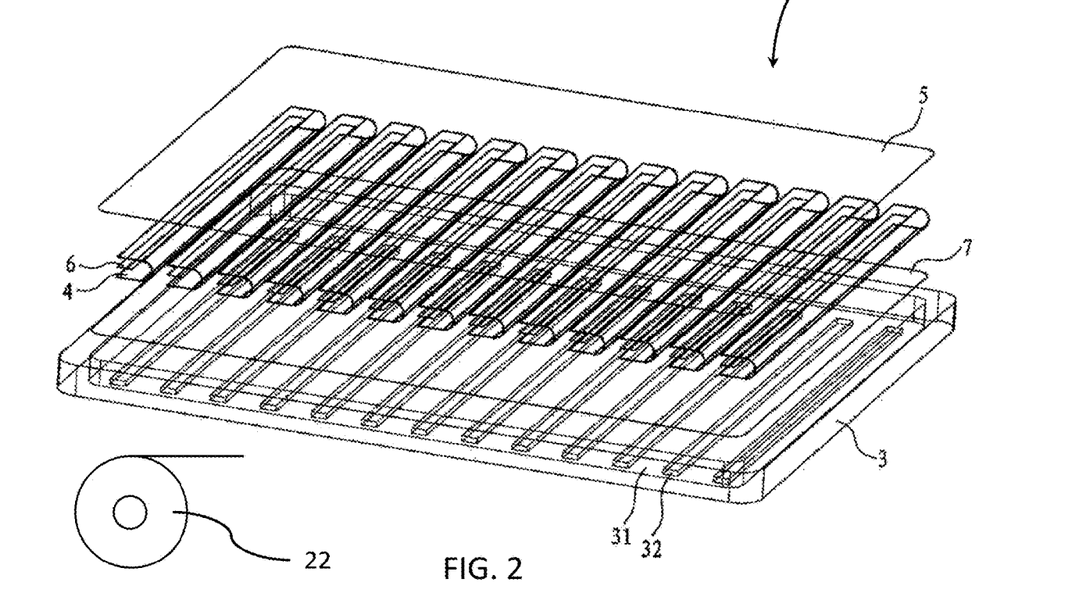
FIG. 2 is an exploded diagram showing a components of an inflatable product aligned for welding.

As shown in FIG. 2 and in combination with the first embodiment of the disclosure shown in FIG. 1, tensioning structures 4 are plastic strips, preferably made of a weldable plastic, such as PVC. According to this embodiment, tensioning structures 4 form an integral strip of material. According to the present method of manufacturing inflatable product 10, tensioning structures 4 are cut into strips from a sheet of bulk material. Next, a lower sheet 7 of material, such as PVC, is placed in staging box 3. Tensioning structures 4 are folded so that the longitudinal edges of tensioning structures 4 are aligned.

According to the preferred embodiment of the present disclosure, an isolating member 6 is positioned between the tips of each folded tensioning structure 4. Folded tensioning structures 4 with isolating members 6 positioned therein are positioned on lower sheet 7 that was previously positioned on staging box 3. According to one embodiments, alignment marks are provided on staging box 3 (or elsewhere) to facilitate alignment of the tips (also referred to as first and second portions) of folded tensioning structures 4 over slots 32 of staging box 3. Upper sheet 5 of inflatable product 10 is then positioned over folded tensioning structures 4 in staging box 3. Staging box 3 is positioned in the high-power high frequency welding machine so that slots 32 of staging box 3 are aligned and positioned over lower bars 21 of lower die 2. Upper and lower dies 1, 2 are moved toward each other so that lower sheet 7, tips/portions of folded tensioning structures 4, and isolating members 6 are positioned and clamped between respective upper and lower bars 11, 21. Next, the high-frequency welder is energized to weld upper sheet 5 to the upper tip/first portion of each tensioning structure 4 and lower sheet 7 to the lower tip/second portion of each tensioning structure 4 at the same time. Thus, an upper tip of one tensioning structure 4 is welded to upper sheet 5 at the same time that the lower tip of the same tensioning structure 4 is welded to lower sheet 7. By positioning isolating member 6 between the upper and lower tips/portions of the respective tensioning structures 4, the upper and lower tips of the respective tensioning structures 4 are not welded together. Thus, upper and lower sheets 5, 7 can be welded to tensioning structures 4 at the same time rather than at separate times. After welding is complete, dies 1, 2 are separated and staging box 3 can be removed from welder 12 along with the partially formed inflatable product 10. Isolating members 6 may be removed or not removed from inflatable product 10.

According to the preferred embodiment of the present disclosure, isolating member 6 can be insulating paper, release paper or the insulating paper made of other materials, and can also adopt a sheet with a low cost and a small thickness, such as non-woven fabric, laminated fabric or oxford fabric and the like, as long as the sheet can block the welding of the adjacent tips of tensioning structures 4. According to one embodiment, isolating member 6 is a non-metallic, flexible film. Such a film (or other isolating material) may come will come loose from one or both of weld strips 81 between which it is sandwiched.

According to the preferred embodiment of the present disclosure, isolating material 6 is a plastic film having a width about three times the width of the contact portion of bars 11, 12 and a thickness substantially less than the thickness of tensioning structure 4 and upper and lower sheets 5, 7. Preferably, isolating material 6 is provided on rolls 22 (only one roll 22 is shown). During positioning of isolating material 6, each respective isolating material is unrolled from roll 22 of isolating material 6 and positioned between respective tips of each tensioning structure 4. Before or after positioning is complete, each respective piece of isolating material 6 is cut or otherwise detached from roll 22 of isolating material 6. As mentioned above, after welding is complete, isolating material 6 may be removed or not removed from inflatable product 10. When isolating material 6 is not removed, it remains inside inflatable product 10. As such, when inflatable product 10 is inflated, isolating material 6 remains inside the inflatable product.

According to the present disclosure, inflatable product 10 is an air mattress. To complete the manufacturing process, a side wall/panel 36 may be welded to upper and lower sheets 5, 7 to cooperate with upper and lower sheets 5,7 to define an inflatable interior/chamber. Additionally, side wall 36 (or other exterior layer) may be provided with an air valve (not shown) to facilitate inflating and deflating inflatable product 10. Additional details of a suitable air mattress are provided in PCT Patent Publication No. WO2013/130117 A1, titled "INTERNAL TENSIONING STRUCTURES USABLE WITH INFLATABLE DEVICES", to Lin et al., filed Jun. 12, 2012, the entire disclosure of which is expressly incorporated by reference herein. According to alternative embodiments of the present disclosure, inflatable product 10 may be other devices, such as inflatable couches, chairs, pools, spas, swim floats, slides, or other inflatable devices.

Figure 3:
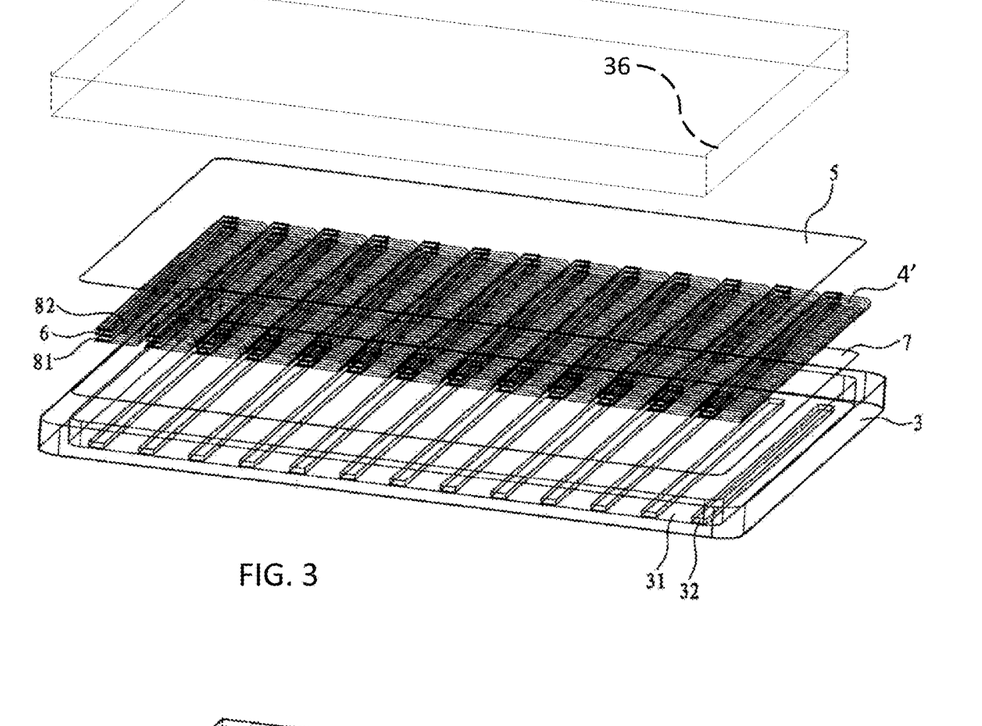
FIG. 3 is an exploded diagram showing a components of another embodiment inflatable product aligned for welding.
Figure 4:
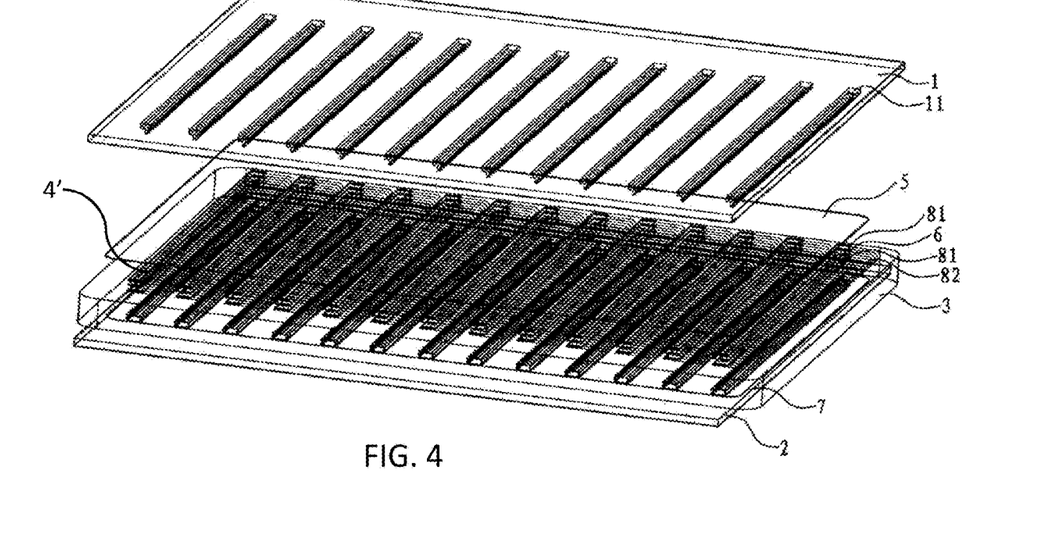
FIG. 4 is a schematic diagram showing the welder of FIG. 1 aligned relative to the inflatable product components of FIG. 3 for welding.
Figure 5:
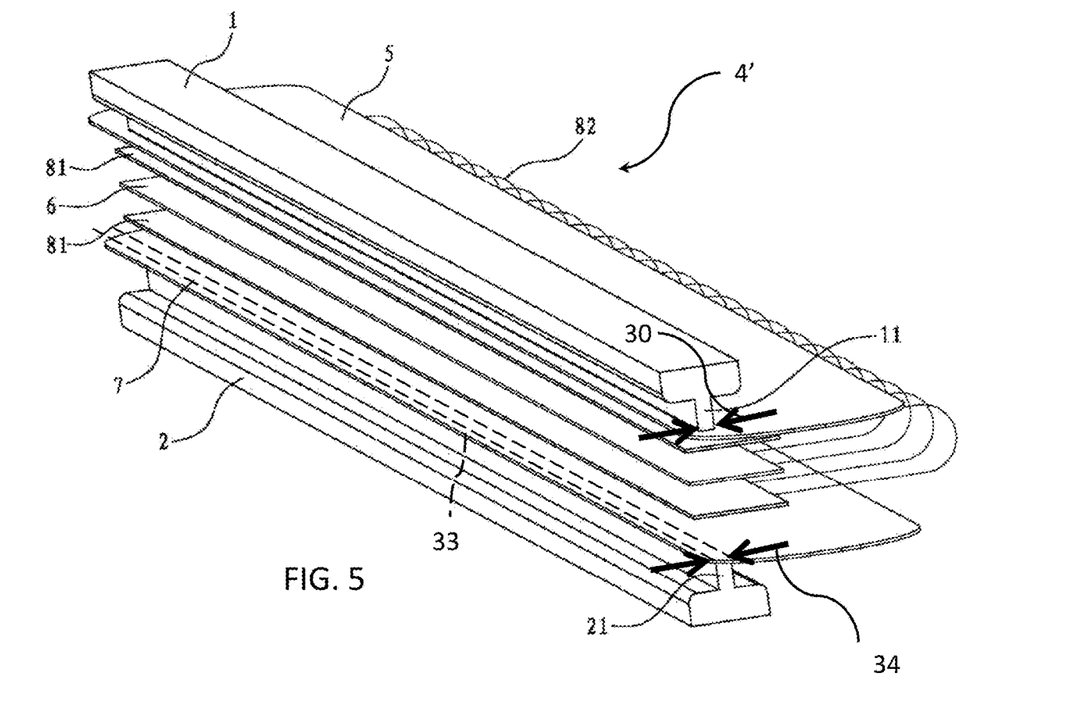
FIG. 5 is a partial enlarged view showing the inflatable product components of FIG. 3 and the welder of FIG. 3.

An alternative embodiment tensioning structures 4' are shown in FIGS. 3, 4 and 5. Tensioning structures 4 include a plurality of strands 82 and two pair of plastic weld strips 81, preferably PVC that capture strands 82 at both ends. Weld strips 81 are welded to upper sheet 5 and lower sheet 7 of inflatable product 10. In an exemplary embodiment, weld strips 81 and upper and lower sheets 5, 7 are made of PVC. Upper and lower sheets 5, 7 and weld strips 81 have thicknesses ranging from 0.15 to 1.0 millimeters with 0.34 millimeters being preferred for upper and lower sheets 1, 2 and 0.18 millimeters being preferred for weld strips 81. Additional details of suitable tensioning structures 4' are provided in in PCT Patent Publication No. WO2013/130117 A1, which was previously incorporated by reference herein.

Tensioning structures 4' are welded to upper and lower sheets 5, 7 in a manner similar to that described above for tensioning structures 4. Lower sheet 5 is positioned in staging box 3, tensioning structures 4' are folded so that respective pairs of weld strips 81 are positioned adjacent each other, isolating material 6 is positioned between respective weld strips/tips/portions 81 of folded tensioning structures 4', upper sheet 7 is positioned in staging box 3, staging box 3 is positioned in welder 12, upper and lower dies 1, 2 are drawn together, welder is energized to simultaneously weld upper weld strips 81 to upper sheet 5 and lower weld strips 81 to lower sheet 7, and staging box 3 is removed from welder 12. As discussed above, isolating material 6 prevents the respective upper and lower weld strips 81 from welding together and isolating materials 6 may or may not be removed from inflatable product 10. According to alternative embodiments of the present disclosure other forms of weld strips 81 may be provided, for example, a single weld strip 81 may be provided at each tip/portion of tensioning structure rather than a pair of weld strips 81 as disclosed in PCT Patent Publication No. WO2013/130117 A1, which was previously incorporated by reference herein. Additionally, a plastic adhesive sheet (not shown) may be provided on strands 82 as disclosed in PCT Patent Publication No. WO2013/130117 A1, which was previously incorporated by reference herein. A laminate sheet with a grid of strands 82 and one or two adhesive sheets may also be provided as disclosed in U.S. patent application Ser. No. 14/444,474, titled "INFLATABLE SPA," filed Jul. 28, 2014, the entire disclosure of which is expressly incorporated by reference herein.

Figure 7:
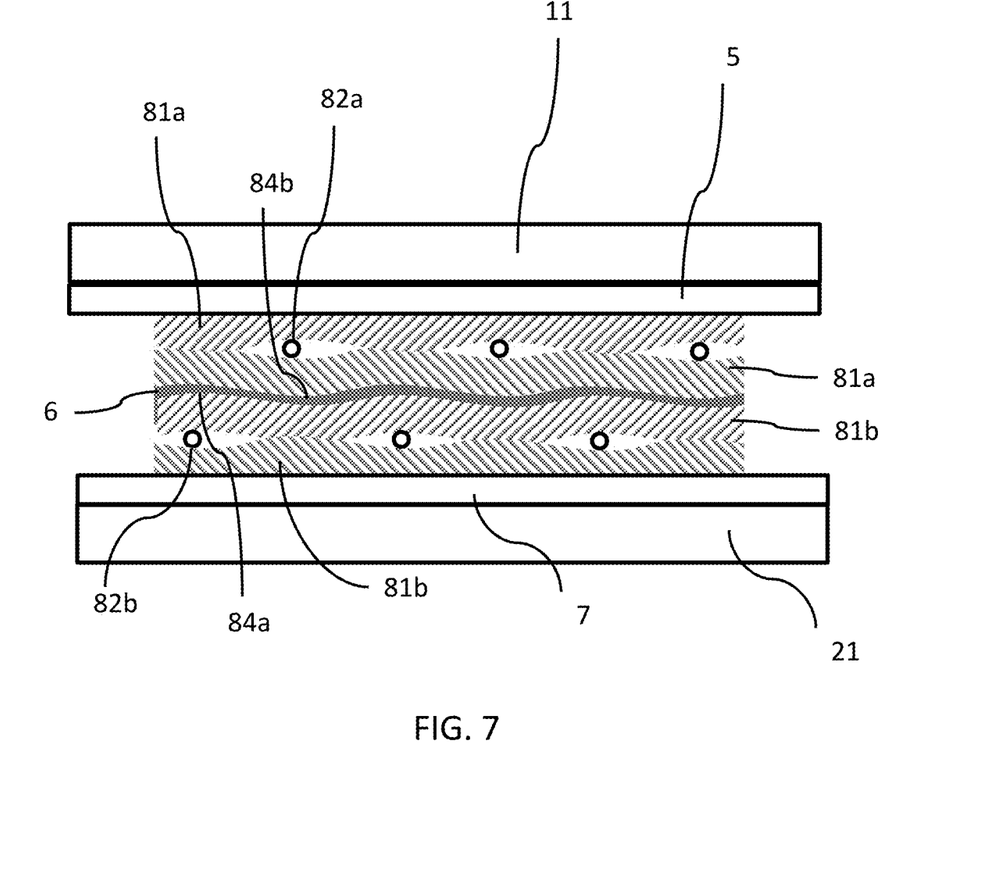
FIG. 7 is a diagrammatic cross-sectional view of a showing a portion of the inflatable product of FIG. 3 clamped between first and second bars of upper and lower dies of welder 12 showing strands creating recesses in the layers of material of the inflatable product.

As shown in FIGS. 5 and 7, the only material positioned between upper and lower bars 11, 12 are upper and lower sheets 5, 7, weld strips 81, portions of strands 82, and isolating material 6. Thus, during welding when upper and lower bars 11, 21 are drawn together, upper and lower bars 11, 21 are only separated by the thickness of upper and lower sheets 5, 7, weld strips 81, strands 82, and isolating material 6. Upper and lower sheets 5, 7 are separated by the thickness of weld strips 81, portions of strands 82, and isolating material 6. Similarly, weld strips 81 are separated by the thickness of isolating material 6. According to the preferred embodiment, the thickness of isolating material 6 is less than the thickness of a single weld strip 81 (or the thickness of tensioning structure 4 discussed above). Thus, during welding upper and lower pairs of weld strips 81 are separated by a thickness less than the thickness of a single weld strip 81 (or less than the thickness of tensioning structure 4 discussed above). Upper and lower bars 11, 21 have a width 30 at their point of contact with respective upper and lower sheets 5, 7. During welding, seams 32 having a width 34 are formed in between upper sheet 5 and upper pair of weld strips 81 and lower sheet 7 and lower pair of weld strips 81. During welding, upper and lower bars 11, 21 are separated by a distance less than widths 30, 34. Isolating material 6 has a thickness less than widths 30, 34. According to the preferred embodiment of the present disclosure, the thickness of isolation material 6 is less than one tenth of widths 30, 34. According to other embodiments, the ratio of the thickness of isolation material 6 to widths 30, 34 is 1.0, 0.75, 0.5, 0.25, 0.15, 0.05, 0.025 or less.

Figure 6:
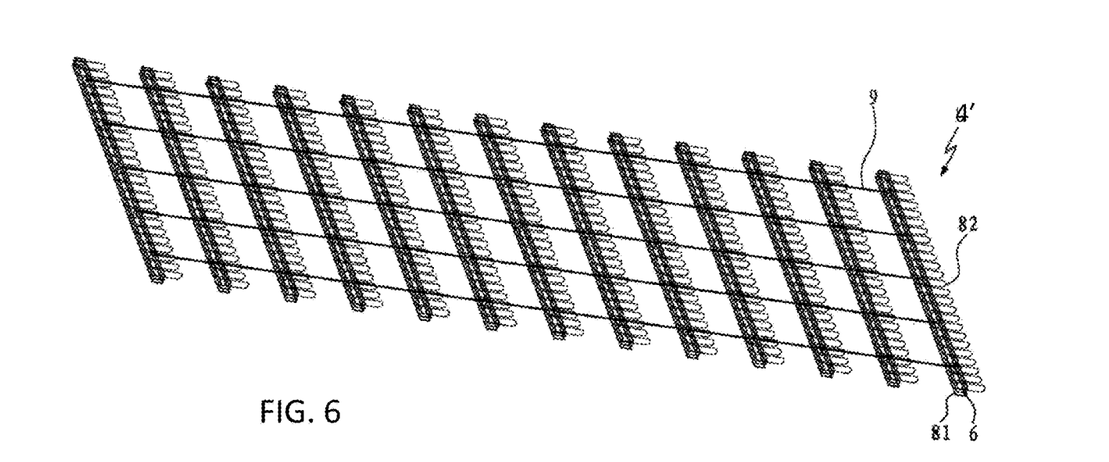
FIG. 6 is a schematic diagram of another embodiment inflatable product including alignment threads.

As shown in FIG. 6, alignment strands 9 may be provided for tensioning structure 4' that keep adjacent tensioning structures 4' at a desired spacing for welding. To assembly inflatable product 10, each tensioning structure 4' is folding so that isolating member 6 is sandwiched between respective pairs of weld strips 81. Next, adjacent tensioning structures 4' are connected together with alignment strands 9 at the desired spacing by adhering alignment strand 9 to welds strips 81. According to one embodiment, one alignment strand 9 is positioned below tensioning structures 4' and adhered to the underside of the lower-most weld strip 81. Another alignment strand 9 is positioned above tensioning structures 4' directly above the other alignment strand 9 and adhered to the topside of the upper-most weld strip 81. To further assist with keeping tensioning structures 4' aligned, the upper and lower alignment strands 9 may be adhered to each other near each weld strip 81. Because each pair of weld strips 81 is adhered to either the top or bottom alignment strand 9 and the top and bottom alignment strands 9 are adhered to each other, the top and bottom pairs of weld strips 81 are coupled to each other through the top and bottom alignment strands 9. As shown in FIG. 6, multiple alignment stands 9 (or pairs of alignment strands 9) are adhered across the length of the tensioning structures 4'.

As discussed above, upper sheet 5 of inflatable product 10 is placed in staging box 3. Next, the left-most tensioning structure 4' (or the alignment strands 9) is pulled over lower sheet 7 and staging box 3 until it is positioned over the left-most slot 32 of staging box 3. As the left-most tensioning structure is pulled, the other tensioning structures 4' are also pulled by alignment strands 9 and positioned over their respective slots 32 in staging box 3. Upper sheet 5 of inflatable product 10 is then positioned over tensioning structures 4'. Staging box 3 is then pushed into the high-power high frequency machine, upper and lower dies 1, 2 are drawn together and upper and lower pairs of weld strips 81 are simultaneously butt welded to respective upper and lower sheets 5, 7. After this welding step, staging box 3 is removed from welder 12 and isolating member 6 may be removed or not removed from within inflatable product 10. Later, a side panel 36 may be welded to the perimeter edges of upper and lower sheets 5, 7 to define an inflatable chamber as discussed above. According to other embodiments, upper and lower sheets 5, 7 may be welded together along their perimeters to define an inflatable chamber.

Alignment strands 9 may be made of a weaker strength strand sufficient for maintaining the alignment of tensioning structures 4'. For example, when inflatable product 10 is inflated, alignment strands 9 can be pulled apart without impacting the shaping function of tensioning structures 4'. Similarly, the adhesion of alignment strands 9 to weld strips 81 and/or each other can be weak, but sufficient to maintain the alignment of tensioning structures 4'. For example, when inflatable product 10 is inflated, alignment strands 9 can become detached from weld strips 81 of tensioning structures 4' so tensioning structures 4' can perform their shaping function. Similarly, the adhesion of the upper and lower alignment strands 9 discussed above can be weak so that upper and lower pairs of weld strips 81 can separate when the inflatable product 10 is inflated. Alignment strands 9 may also be provided with PVC sheet tensioning structures 4 of FIG. 2.

According to an alternative embodiment of the present disclosure, isolating member 6 is an insulating ink, such as water-based ink, or other liquid that is printed or otherwise applied to one side of a pair of weld strips 81 to isolate weld strips 81 from each other during welding. The process of welding tensioning structures 4' to upper and lower sheets 5, 7 may follow the same steps as described above. Because isolating member 6 is applied to weld strips 81 it is preferably to not remove the isolating material from weld strips 81. These types of isolating members 6 may also be applied to all or portions of PVC sheet tensioning structures 4 of FIG. 2. For example, insulating ink may be applied to one side of tensioning structures 4 or only the portions necessary to avoid welding respective inner tips/portions of folded tensioning structures 4 together.

The isolating materials described herein may be applied to weld strips 81 before or after tensioning structures 4' are formed. For example, weld strips 81 are preferably formed from a roll of PVC material as described in PCT Patent Publication No. WO2013/130117 A1, which was previously incorporated by reference herein. This roll of material may include PVC weld strip material and the isolating material 6 applied to the PVC weld strip material. Thus, the isolating material 6 may be applied to weld strips 81 before individual weld strips 81 are cut to length and/or before strands 82 are adhered to weld strips 81.

During welding of weld strips 81 to upper and lower sheets 5, 7, upper and lower sheets 5, 7, weld strips 81, strands 82, and isolating material 6 are clamped by upper and lower bars 11, 21. During this clamping and welding, certain characteristics of structures on one side of isolating member 6 may be transferred to structures on the other side of isolating member 6. For example, as shown in FIG. 7, strands 82 positioned between one pair of weld strips 81a are offset from strands from the opposite pair of weld strips 81b. The protrusions created by upper strands 82a create depressions 84b in lower weld strips 81b. Similarly, the protrusions created by lower strands 82b create depressions 84a in upper weld strips 81a. After welding and unclamping of bars 11, 12, these depressions 84a, 84b remain in weld strips 81a, 81b. In addition to leaving a characteristic on the opposite sides of isolating member 6, the protrusion may leave characteristics in isolating members 6. For example, after clamping and welding, holes may be created in isolating members 6 where strands 82 make impressions in isolating members 6.

During welding and clamping, bars 11, 21 create seams 33 between upper and lower sheets 5, 7 and weld strips 81. The outer perimeter profile of seams 33 is generally defined by the area of clamping overlap between bars 11, 21. As such, the perimeter of seam 33 of upper sheet 5 is generally the mirror image of the perimeter of seam 33 of lower sheet 7.

Additionally, after clamping and welding, portions of isolating material 6 may remain on weld strips 81. Some of these portions may remain even though the rest of the respective isolating member 6 is removed from inflatable product 10. These remaining portions may be visible or microscopic.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed:

1. An inflatable product including:
a first sheet made of weldable plastic;
a second sheet made of weldable plastic, the first and second sheets cooperating to define an inflatable chamber;
a plurality of tensioning structures, each tensioning structure including a weldable plastic, a first portion of each of the tensioning structures being welded to the first sheet and a second portion of each of the tensioning structures being welded to the second sheet, wherein the first portion of each tensioning structure includes a first pair of weld strips welded to the first sheet and the second portion of each tensioning structure includes a second pair of weld strips welded to the second sheet, a plurality of strands extend between the first portion of each tensioning structure and the second portion of each tensioning structure, a first portion of the plurality of strands are positioned between the first pair of weld strips of the first portion of each tensioning structure and a second portion of the plurality of strands are positioned between the second pair of weld strips of the second portion of each tensioning structure, the first portion of the plurality of strands are offset from the second portion of the plurality of strands such that a contour of the second portion of each tensioning structure includes a protrusion matching a structure of the first portion of each tensioning structure that is recessed and the structure that is recessed of the first portion of each tensioning structure is positioned between the first portion of the plurality of strands positioned between the first pair of weld strips of the first portion of each tensioning structure; and a plurality of isolating members positioned in the inflatable chamber, the isolating members being positionable to isolate the first portions of the tensioning structures from the second portions of the tensioning structures to block all weldable contact between the first and second portions, the plurality of isolating members remaining positioned inside the inflatable chamber together with the plurality of tensioning structures.

2. The inflatable product of claim 1, wherein the isolating members are a flexible film.

3. The inflatable product of claim 1, wherein the isolating members are non-metallic.

4. The inflatable product of claim 1, wherein the isolating members are strips.

5. The inflatable product of claim 1, wherein at least a portion of the isolating members are spaced apart from the tensioning structures.

6. The inflatable product of claim 1, wherein the isolating members have a thickness less than a thickness of the weldable plastic of the tensioning structures.

7. The inflatable product of claim 1, wherein the tensioning structures are parallel and separated by a substantially uniform distance and a width of the isolating members is substantially less than the distance.

8. The inflatable product of claim 1, wherein perimeter edges of the first and second sheets are welded together.

9. The inflatable product of claim 1, further comprising a side panel is welded to perimeter edges of the first and second sheets.

* * * * *